Sept. 28, 1926.

D. C. McROBERTS 1,601,574

TUBE VULCANIZING APPARATUS

Filed Oct. 1, 1923

Inventor
DONAL C. McROBERTS
By his Attorney

Patented Sept. 28, 1926.

1,601,574

UNITED STATES PATENT OFFICE.

DONAL C. McROBERTS, OF INDIANAPOLIS, INDIANA, ASSIGNOR TO G. & J. TIRE COMPANY, OF INDIANAPOLIS, INDIANA, A CORPORATION OF INDIANA.

TUBE-VULCANIZING APPARATUS.

Application filed October 1, 1923. Serial No. 665,820.

This invention relates to the manufacture of tubular rubber articles in general, but more particularly inner tubes for pneumatic tires.

While various practices have been followed in manufacturing inner tubes, the most extensively used is the ply method in which calendered stock is coiled a plurality of times around a pole and then confined externally by a fabric tape wound spirally thereabout. Subsequently, it is vulcanized, the wrapper removed, the tube stripped from the pole, and its ends skived, buffed and cemented together to form a complete annulus. The wrapper necessarily forms indentations in the face of the tube with which it is in contact and consequently, the product is not of uniform wall thickness. A great deal of equipment is required in this process and the apparatus occupies a large amount of floor space.

The present invention aims to provide a simple and improved method for manufacturing tubes, to improve the tube as an article of manufacture and to provide novel apparatus for carrying on the manufacture. The labor involved in manufacturing the tube of the present invention is materially less than that involved in prior practices as all or most of the former operations, rolling, wrapping, loading and unloading heater trucks, trimming and skiving, may be eliminated. Likewise also, the apparatus which has heretofore been employed for carrying on the various operations above enumerated may be done away with, in large part or entirely. And this would also economize in floor space, an item of no inconsiderable importance in connection with the manufacture of tubes. The equipment investment would be materially reduced and the rate of production appreciably increased. Still further, the elimination of many operations would make it easier to trace the source of defects, which almost invariably arise from time to time in production. The apparatus required, merely a simple full-molding equipment, is durable and substantial, and almost foolproof against mishap once properly constructed for the various sizes of tubes.

With the illustrated embodiment in mind but without intention to limit the invention more than is required by the prior art, it may be briefly stated to consist in vulcanizing rubber composition between internal and external molding members of substantially rigid material shaped, when assembled, to define a completely closed tubular cavity. The molding members are in direct engagement at their ends not only to complete the closure of the cavity but also to mutually sustain the parts in proper relation for making the wall thickness of the tubes uniform. Preferably, the molding members are provided adjacent their engaged extremities with converging or bevelled walls for molding the rubber in a shape suitable for making a spliced joint.

A preferred embodiment of the invention is illustrated in the accompanying drawings, in which:—

Figure 1:
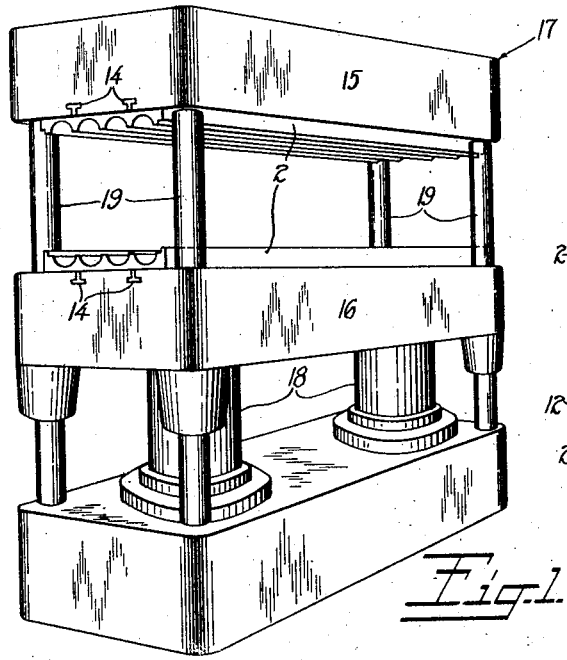
Figure 1 is a perspective of one type of steam-heated press to whose platens external molding members or sections are shown attached.
Figure 4:
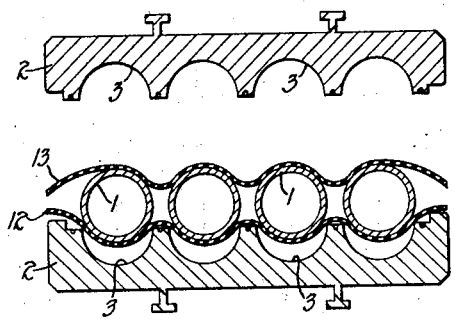
Figure 2:
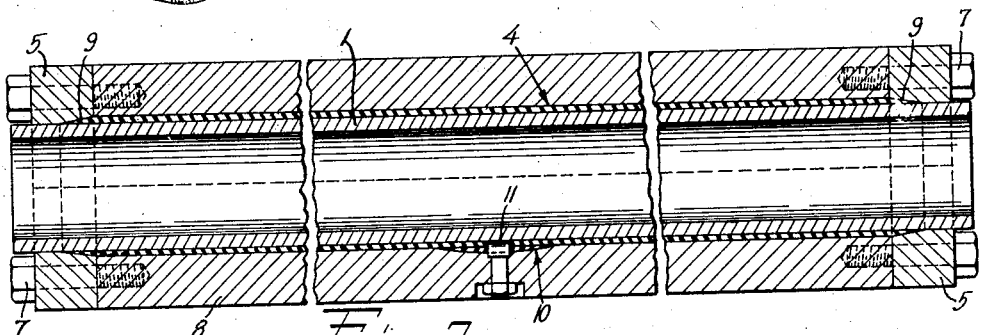
Figure 2 is a longitudinal cross-section through an assemblage of the molding members.

And Figure 4 is a transverse cross-section illustrating the manner in which the molding members and rubber are manipulated.

Figure 5:

And Figure 5 is a section of a modified closure-flange.

According to my invention, the tube is full molded, that is to say, it is completely confined between internal and external molding members, preferably of rigid material. The internal member is preferably in the form of a heavy walled non-collapsible cylindrical metal tube, known as a "pole," indicated at 1, and the external molding members are preferably in the form of sections 2, of substantially duplicate construction, each of which is provided with semi-circular grooves or channels 3, cut enough larger than the pole to enable the rubber composition tube to be cured the requisite wall thickness. Any suitable material may be employed for making molding members, such, for instance, as steel or cast iron, and they may be hollowed out or made solid as desired.

Figure 3:
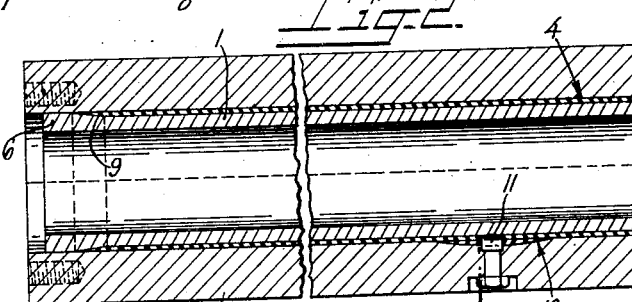
Figure 3 is a similar section showing a slightly modified construction.

The ends of the cavity 4, which is defined between the pole and external mold sections, may be closed off in any suitable manner, as with flanges or projections 5 and 6, which snugly and directly contact with the pole and the mold sections, respectively, so that the parts are mutually sustained in the proper spaced relation to allow the tube to be vulcanized with a uniform wall thickness. The flanges 5 may be carried by the mold sections, in which case they may be bolted, as at 7, to the intermediate body portion 8 thereof, or projections 6 may be secured or formed integral with the poles 1. Or, the flange at one end of the assemblage may be carried by the outer mold section, and at the other end the projection may be carried by the pole, as illustrated in Figure 3. Of course, bevelled collars may be used in lieu of the integral structure shown at the left of Figure 3.

However the end-closing flange or projections may be mounted or secured, it is preferred (but not essential as the ends may be vulcanized square) to provide immediately adjacent thereto, converging or conical surfaces 9, so as to mold the ends of the tubes with bevels facilitating their subsequent splicing and eliminating the skiving operations heretofore necessary.

For the location and reception of the valve-base, and in order not to unduly decrease the wall thickness in the region where the valve-stem is to be mounted, one of the mold sections, preferably the lower, is provided with a socket or depression 10, centrally of which and projecting inward, and preferably against the pole, is a pin 11. The pin 11 is adapted to pass through the center of the apertured valve-base, which may be made of rubberized fabric, woven or cord, in any suitable and convenient manner. The pin 11 is desirable, but not essential, and may be omitted.

While the green, i. e., unvulcanized, rubber composition may be initially amassed or assembled in any suitable manner, as, for instance, by tubing the stock in an extruding machine and mounting it on the poles, or calendering the stock and making a one or more ply wrap thereof around the pole, or cutting up calendered sheets into strips of the requisite length and of a width approximately equal to half the circumference of the pole, in which case the cavities in each of the mold sections would be lined therewith before the pole is positioned, all of which alternative practices will be apparent to those skilled in the art, it is preferred to follow the method illustrated in Figure 4 of the drawings. In this preferred method, a sheet 12 of suitable rubber composition is laid over the lower mold section. Then the poles are positioned as desired, but preferably with one or both edges of the stock free to move until the cavities 3 near the edges of the mold section are occupied or loaded. Then a second sheet 13 of rubber composition is laid in place over the pole, substantially as shown, and then the upper mold section applied and the two sections closed.

The mold sections 2 may be hollowed out for the supply of steam thereto, wherewith to heat and vulcanize the rubber, in which case clamps may be employed to hold the mold sections together, but it is more convenient, and preferable, to attach the mold sections, either permanently or removably, as with bolt heads engaging in slots 14 provided in the platens 15 and 16 of a press, indicated generally at 17, having fluid pressure operable rams 18 and guide-rods 19 for the lower platen.

It will be apparent to those skilled in the art that the present invention obviates many operations heretofore performed in the manufacture of inner tubes, in all cases, wrapping, unwrapping, loading on trucks and unloading therefrom, as well as shifting of the trucks, being completely eliminated. In all instances, the material of which the tube is made is completely confined during vulcanization between the internal and external molding members. In other words, the tube is formed by what is known in the art as a "full molding operation", all portions of the article being confined metallically and rigidly during vulcanization. Consequently, the tube may be manufactured of uniform wall thickness and with a smooth finish on both its inside and outside surfaces.

After the tube has been vulcanized by a curing treatment suited to its composition, usually by heating with steam, it is removed from the mold assemblage and stripped from the pole, in which operation it is turned inside out. Then, its ends are skived off, if necessary. But, preferably, the tube is vulcanized in a form dispensing with such skiving operation and buffed and united together in any suitable manner, as with cement followed by heat treatment or not as required. Before splicing the ends of the tube together, however, the valve-stem is usually introduced in the tube. After splicing, this valve-stem may be permanently mounted in position. The tube is then tested and, if found perfect, boxed ready for the trade.

As some tubes of the same cross-section are manufactured in different lengths, one of the end closures may be made as shown in Figure 5, with a cylindrical surface 20 adjacent the bevelled surface 21 and the pole-engaging face 22, the former (20) to continue the cavity 3 in a mold section whose intermediate portion 8 may be made of a length to accommodate the shortest tube of a given size.

In the foregoing, the invention has been set forth so as to enable one skilled in the art to practice it. It will be obvious that many changes may be made in the details of procedure and in the construction of the apparatus without departing from the broad underlying principles. For instance, the tubes need not be circular in cross-section as it may be desirable to vulcanize them in other shapes, for example, more or less flat, or elliptical. Obviously also, they may be cured curved in the direction of the length instead of straight. Such modifications are comprehended in the broad invention, although in such cases all the advantages of vulcanizing on straight poles may not be realized, at least to the same degree. The molds have been disclosed as split horizontally and closed by upward movement. Of course, however, they may be positioned in more or less vertical planes and closed by horizontal movement. Such variations, and others of similar character, are comprehended. Reference should therefore be made to the appended claims for an understanding of the scope of the invention.

Having thus described my invention what I claim and desire to protect by Letters Patent is:

1. Tube vulcanizing apparatus comprising internal and external molding members shaped to define, when assembled, a tube molding cavity the external molding members directly engaging and supporting the internal members and closing off the ends of the molding cavity, the external members being provided with inwardly tapering surfaces immediately adjacent the end and the internal molding members having an end outwardly tapering whereby one end of the molded tubes is tapered externally and the other end is tapered internally.

2. Tube vulcanizing apparatus comprising a plurality of poles external mold sections provided with a plurality of grooves for receiving the poles and defining therewith tube-molding cavities, each of said external mold sections having secured thereto a split collar with a pole-engaging cylindrical face and adjacent thereto a conical face for molding an end of the tube with a bevel.

3. Tube vulcanizing apparatus comprising internal and external molding members shaped to define, when assembled, a tube molding cavity, the external molding members having secured thereto a split collar adapted to engage the internal molding members and carrying conical faces which mold the tubes at their end with an inwardly tapering surface.

Signed at Indianapolis, county of Marion, and State of Indiana, this 25th day of September 1923.

DONAL C. McROBERTS.